US012037910B2

(12) United States Patent
Strock et al.

(10) Patent No.: US 12,037,910 B2
(45) Date of Patent: Jul. 16, 2024

(54) FUSIBLE BOND FOR GAS TURBINE ENGINE COATING SYSTEM

(71) Applicant: United Technologies Corporation, Farmington, CT (US)

(72) Inventors: Christopher W. Strock, Kennebunk, ME (US); Enzo DiBenedetto, Berlin, CT (US)

(73) Assignee: RTX Corporation, Farmington, CT (US)

( * ) Notice: Subject to any disclaimer, the term of this patent is extended or adjusted under 35 U.S.C. 154(b) by 799 days.

(21) Appl. No.: 16/724,865

(22) Filed: Dec. 23, 2019

(65) Prior Publication Data

US 2020/0248577 A1 Aug. 6, 2020

Related U.S. Application Data

(63) Continuation of application No. 15/037,127, filed as application No. PCT/US2014/063778 on Nov. 4, 2014, now Pat. No. 10,513,942.

(Continued)

(51) Int. Cl.

*F01D 11/08* (2006.01)
*C23C 4/134* (2016.01)

(Continued)

(52) U.S. Cl.

CPC .............. *F01D 11/08* (2013.01); *C23C 4/134* (2016.01); *F01D 5/12* (2013.01); *F01D 11/12* (2013.01);

(Continued)

(58) Field of Classification Search

CPC . F01D 11/08; F01D 25/24; F01D 5/12; F01D 11/12; C23C 4/134; F05D 2220/32;

(Continued)

(56) References Cited

U.S. PATENT DOCUMENTS 3,545,944 A * 12/1970 Witherell .................. C23C 4/08 428/610
4,194,042 A * 3/1980 Dates ...................... A47J 36/04 220/573.1

(Continued)

FOREIGN PATENT DOCUMENTS

EP 2540868 1/2013
WO 9512004 5/1995

OTHER PUBLICATIONS

E. Alfredo Campo, 2—Mechanical Properties of Polymeric Materials, Editor(s): E. Alfredo Campo, In Plastics Design Library, Selection of Polymeric Materials, William Andrew Publishing, p. 77 (Year: 2008).*

(Continued)

*Primary Examiner* — Courtney D Heinle
*Assistant Examiner* — Andrew Thanh Bui
(74) *Attorney, Agent, or Firm* — Carlson, Gaskey & Olds, P.C.

(57) ABSTRACT

A seal comprises a housing. A coating has at least two layers with a bond layer to be positioned between a housing and a second hard layer. The second hard layer is formed to be harder than the bond layer. The bond layer has a bond strength greater than or equal to 200 psi and less than or equal to 2000 psi. A gas turbine engine, and a method of forming a coating layer are also disclosed.

9 Claims, 2 Drawing Sheets

Related U.S. Application Data

(60) Provisional application No. 61/913,948, filed on Dec. 10, 2013.

(51) Int. Cl.
*F01D 5/12* (2006.01)
*F01D 11/12* (2006.01)
*F01D 25/24* (2006.01)

(52) U.S. Cl.
CPC .......... *F01D 25/24* (2013.01); *F05D 2220/32* (2013.01); *F05D 2230/31* (2013.01); *F05D 2230/90* (2013.01); *F05D 2300/173* (2013.01); *F05D 2300/212* (2013.01)

(58) Field of Classification Search
CPC ............. F05D 2230/31; F05D 2230/90; F05D 2300/173; F05D 2300/212
See application file for complete search history.

(56) References Cited

U.S. PATENT DOCUMENTS

| | | | | |
|---|---|---|---|---|
| 5,350,599 | A * | 9/1994 | Rigney | F01D 5/288 427/255.7 |
| 6,102,656 | A | 8/2000 | Nissley et al. | |
| 6,203,021 | B1 * | 3/2001 | Wolfla | F16J 15/445 277/415 |
| 6,860,718 | B2 * | 3/2005 | Suzuki | F01D 11/001 415/173.5 |
| 7,435,056 | B2 * | 10/2008 | Liston | F01D 5/288 416/230 |
| 7,998,581 | B2 * | 8/2011 | Yasui | C23C 28/42 428/403 |
| 8,061,978 | B2 | 11/2011 | Tholen et al. | |
| 8,557,342 | B2 | 10/2013 | Wagh et al. | |
| 8,876,470 | B2 * | 11/2014 | Strock | C23C 28/34 415/174.4 |
| 9,103,035 | B2 * | 8/2015 | Ganesh | C23C 24/04 |
| 2003/0121777 | A1 * | 7/2003 | Sato | C23C 4/00 118/728 |
| 2003/0170119 | A1 | 9/2003 | Fried | |
| 2006/0099440 | A1 | 5/2006 | Sahoo | |
| 2007/0218309 | A1 * | 9/2007 | Hajmrle | C23C 4/10 428/544 |
| 2008/0026142 | A1 * | 1/2008 | Vontell | C09J 5/06 427/207.1 |
| 2008/0026160 | A1 * | 1/2008 | Taylor | C23C 4/18 427/454 |
| 2009/0123737 | A1 | 5/2009 | Yasui et al. | |
| 2009/0136740 | A1 | 5/2009 | Reynolds et al. | |
| 2009/0148278 | A1 | 6/2009 | Allen | |
| 2010/0226783 | A1 * | 9/2010 | Lipkin | C23C 30/00 416/241 B |
| 2011/0045264 | A1 * | 2/2011 | Heutling | C23C 28/048 428/216 |
| 2011/0048017 | A1 | 3/2011 | Margolies et al. | |
| 2012/0063888 | A1 | 3/2012 | Strock et al. | |
| 2012/0099973 | A1 * | 4/2012 | Strock | C23C 28/027 427/373 |

OTHER PUBLICATIONS

Picas, J.A., Punset, M., Baile, M.T., Martin, E. and Forn, A. (2009), Properties of WC—CoCr Based Coatings Deposited by Different HVOF Thermal Spray Processes. Plasma Processes Polym., 6: S948-S953. (Year: 2009).*
International Search Report from corresponding PCT/US14/63778.
International Preliminary Report on Patentability for International Application No. PCT/US2014/063778 mailed Jun. 23, 2016.
Supplementary European Search Report for European Application No. 14879855.6 mailed Oct. 12, 2017.

* cited by examiner

FUSIBLE BOND FOR GAS TURBINE ENGINE COATING SYSTEM

CROSS-REFERENCE TO RELATED APPLICATION

This application is continuation of U.S. patent application Ser. No. 15/037,127 filed May 17, 2016, which is a National Phase Application of International Application No. PCT/US2014/063778 filed Nov. 4, 2014, which claims priority to U.S. Provisional Patent Application No. 61/913,948, filed Dec. 10, 2013.

STATEMENT REGARDING FEDERALLY SPONSORED RESEARCH OR DEVELOPMENT

This invention was made with government support under Contract No. 5148262-0302-0343, awarded by the United States Army. The Government has certain rights in this invention.

BACKGROUND OF THE INVENTION

This application relates to a coating system wherein an erosion resistant coating is secured to a housing through a fusible bond layer.

Gas turbine engines are known and, typically, include a fan delivering air into a compressor section. The compressed air is delivered into a combustion section where it is mixed with fuel and ignited. Products of this combustion pass downstream over turbine rotors driving them to rotate.

In modern gas turbine engines, providing a very efficient engine is of increasing importance. Thus, it becomes important to effectively utilize all of the energy produced in the engine. To this end, a compressor section typically includes rotating blades that are spaced from a static housing or case. Sealing surfaces are provided adjacent an outer surface of the blades to provide close clearance between the blade and the housing. This prevents leakage of the air around the blades, which would reduce the efficiency of the engine.

Gas turbine engines, for example for military applications, are being utilized more and more in environments having significant particulates, such as dust and sand. Such an environment raises challenges with regard to maintaining close clearances in the compressor section in that the sand is abrasive. Thus, the coatings provided on the case are being provided by increasingly hard coatings which are resistant to impact from abrasives such as sand. However, challenges arise in that under certain conditions the compressor blade may extend further outwardly than normal and contact this coating. Since the coating is hard, this contact can prove problematic and could result in damage to the blades.

It is also known that a bare base metal may surround the blades, which is of course also hard.

SUMMARY OF THE INVENTION

In a featured embodiment, a seal comprises a housing. A coating has at least two layers with a bond layer to be positioned between a housing and a second hard layer. The second hard layer is formed to be harder than the bond layer. The bond layer has a bond strength greater than or equal to 200 psi and less than or equal to 2000 psi.

In another embodiment according to the previous embodiment, the bond strength is a cohesive bond strength.

In another embodiment according to any of the previous embodiments, the bond strength is between 750 and 1500 psi.

In another embodiment according to any of the previous embodiments, the bond strength is between 900 and 1250 psi.

In another embodiment according to any of the previous embodiments, the hard layer is formed of a ceramic.

In another embodiment according to any of the previous embodiments, the bond layer is formed of a ceramic.

In another embodiment according to any of the previous embodiments, the bond layer is formed of the same ceramic as the hard layer.

In another embodiment according to any of the previous embodiments, the ceramic is an alumina/titania ceramic.

In another embodiment according to any of the previous embodiments, the hard layer is formed of a metal.

In another embodiment according to any of the previous embodiments, the hard layer may be an aluminum silicon alloy.

In another embodiment according to any of the previous embodiments, the hard layer has a thickness greater than or equal to 0.002 inch (0.00502 centimeters) and less than or equal to 0.050 inch (0.127 centimeters).

In another embodiment according to any of the previous embodiments, a thickness of the bond layer is between 0.00075 inch (0.001905 centimeters) and less than or equal to 0.00125 inch (0.003175 centimeters).

In another featured embodiment, a gas turbine engine comprises a rotating blade having a radially outer tip. A housing is positioned radially outwardly of the blade. A coating is provided on the housing outwardly of the blade. The coating has at least two layers with a bond layer positioned between the housing and a second hard layer. The second hard layer is formed to be harder than the bond layer. The bond layer has a bond strength greater than or equal to 200 psi and less than or equal to 2000 psi.

In another embodiment according to any of the previous embodiments, the bond strength is a cohesive bond strength.

In another embodiment according to any of the previous embodiments, the bond strength is between 750 and 1500 psi.

In another embodiment according to any of the previous embodiments, the bond strength is between 900 and 1250 psi.

In another embodiment according to any of the previous embodiments, the hard layer has a thickness greater than or equal to 0.002 inch (0.00502 centimeters) and less than or equal to 0.050 inch (0.127 centimeters). A thickness of the bond layer is between 0.00075 inch (0.001905 centimeters) and less than or equal to 0.00125 inch (0.003175 centimeters).

In another embodiment according to any of the previous embodiments, a method of forming a coating layer in a gas turbine engine comprises the steps of depositing a first bond layer onto a housing, and depositing a second hard layer on the bond layer. There is a low bond strength between the bond layer and the hard layer. The bond layer has a bond strength greater than or equal to 200 psi and less than or equal to 2000 psi.

In another embodiment according to any of the previous embodiments, a plasma spray deposit is utilized. The bond layer is deposited with a lower velocity and at a lower temperature than is utilized to deposit the hard layer.

In another embodiment according to any of the previous embodiments, the bond layer and the hard layer are formed of the same material.

These and other features may be best understood from the following drawings and specification.

DETAILED DESCRIPTION

Figure 1:
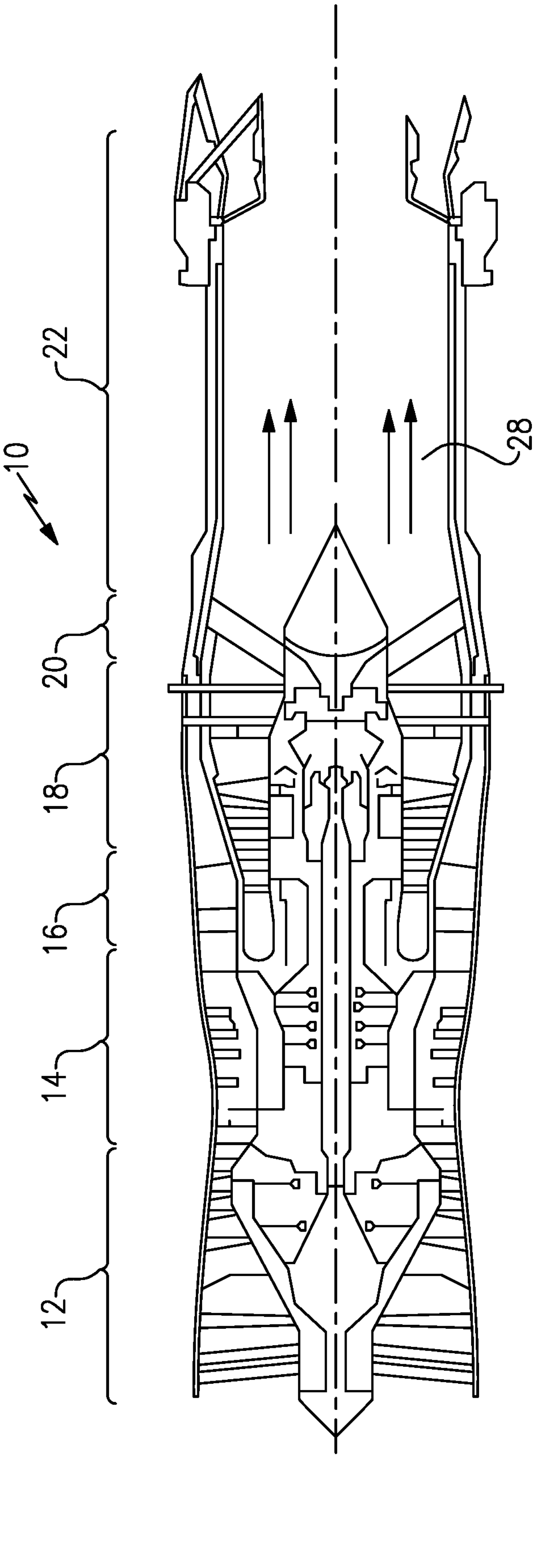
FIG. 1 schematically shows a gas turbine engine.

Referring to FIG. 1, a gas turbine engine 10 includes a fan section 12, a compressor section 14, a combustor section 16, and a turbine section 18. Air entering the fan section 12 is initially compressed and fed to the compressor section 14. In the compressor section 14, the incoming air from the fan section 12 is further compressed and communicated to the combustor section 16. In the combustor section 16, the compressed air is mixed with fuel and ignited to generate a hot exhaust stream 28. The hot exhaust stream 28 is expanded through the turbine section 18 to drive the fan section 12 and the compressor section 14. In this example, the gas turbine engine 10 includes an augmenter section 20 where additional fuel can be mixed with the exhaust gasses 28 and ignited to generate additional thrust. The exhaust gasses 28 flow from the turbine section 18 and the augmenter section 20 through an exhaust liner assembly 22.

Figure 2A:
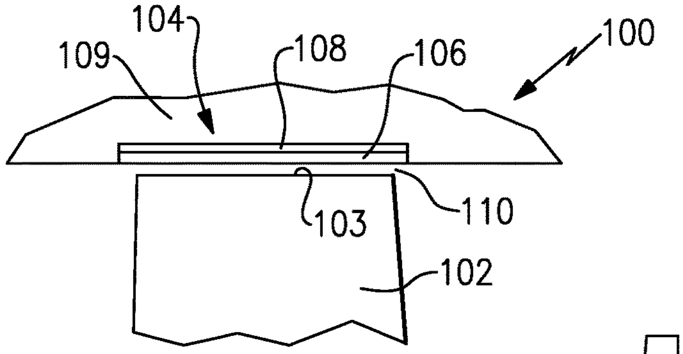
FIG. 2A shows a first coating condition.

FIG. 2A shows a compressor section 100 which may be incorporated into the gas turbine engine of FIG. 1. As shown, a rotating compressor blade 102 is positioned adjacent a seal 104. The seal 104 is intended to maintain a close gap 110 from an outer surface 103 of the blade 102.

As shown, the seal 104 is positioned within a housing 109. The seal consists of two layers with an outer hard layer 106 and a bond layer 108. The bond layer 108 does not provide a strong cohesive bond to the hard layer 106. Rather, there is a relatively low strength cohesive bond.

The low strength bond may also be seen as a strength in a direction perpendicular to the axis of rotation of the engine.

As mentioned below, the shear strength and compressive strength of the bond layer are well correlated to the cohesive bond strength. The bond strengths mentioned below for the cohesive bond strength would also apply to both compressive and shear strengths.

Figure 2B:
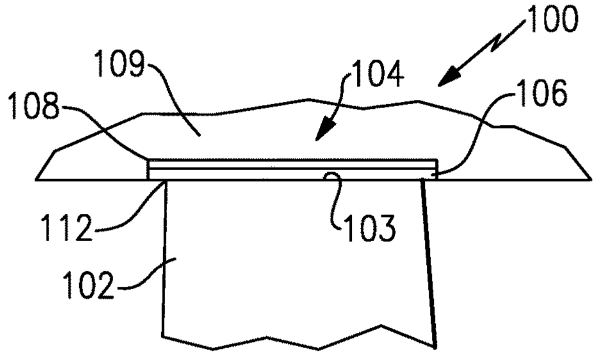
FIG. 2B shows a stressful condition for a coating.
Figure 2C:
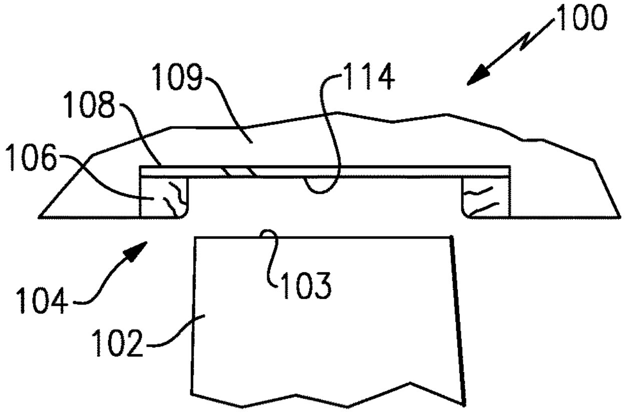
FIG. 2C shows the coating after the condition of FIG. 2B.

Although not shown in FIGS. 2A-2C, there may be a bond coat between the bond layer 108 and the housing 109. A metallic bond coat, as an example, may provide a surface roughness for better adhesion of the bond layer 108. Bond coat example materials may include 95/5 Ni/Al, 80/20 Ni/Cr, NiCrAl, MCrAlY, where M denotes Fe, Co or nickel may also be utilized. Of course, the metallic bond coat is not necessary, and may be omitted.

Thus, as shown in FIG. 2B, should an extreme condition, such as a surge condition, cause the blade 102 to have its tip 103 contact the hard surface layer 106, as shown at point 112. The low bond strength of the bond layer 108 will allow separation.

As shown in FIG. 2C, at area 114, the hard layer 106 has broken away due to the low bond strength with the bond layer 108 after severe rub contact.

In this sense, the bond layer 108 provides an effective "fuse" which releases the hard coating preventing damage to the rotor blade 102.

In embodiments, a thickness of the bond layer 108 is smaller than a thickness of the hard layer 106. The hard layer 106 thickness may be greater than or equal to 0.002 inch and less than or equal to 0.050 inch thick. In other applications, the thickness of the bond layer may be on the order of 0.012 inch thick. The thickness of the bond layer 108 should be smaller than the thickness of the hard layer 106. The bond layer may be between 0.00075 inch (0.001905 centimeters) and 0.00125 inch (0.003175 centimeters). In addition, the hard layer has better erosion resistance properties than the bond layer, as it will see sand and other erosion creating impurities.

Notably, the thicknesses are averaged thicknesses as determined in a metallographic cross-section. The coatings have roughnesses that vary significantly across a layer.

The bond layer 108 and the hard layer 106 may be formed of the same material. As an example, a ceramic material may be deposited on the housing 109 to form both layers 108 and 106, with different deposition techniques utilized to achieve the low bond strength of the bond layer 108.

Figure 3A:
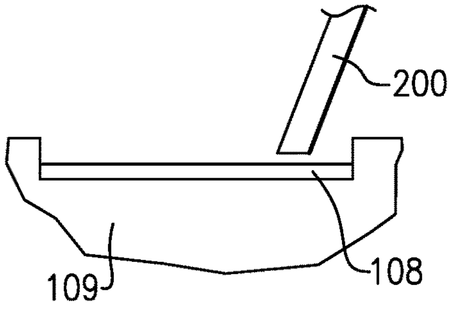
FIG. 3A shows a method step.

As an example, air plasma spray techniques may be utilized as shown in FIG. 3A, with a tool 200, shown schematically depositing the layer 108. The layer 108 may be deposited utilizing a low velocity and relatively cool plasma spray parameters, such that the materials do not melt as completely as would be used to provide a harder coating.

In one example, a 3 MB air plasma spray torch from Sulzer Metco having a "G nozzle" and a "2" powder point was utilized. A torch was set up to use nitrogen primary gas and hydrogen secondary gas. The powder for both a bond layer and a hard layer was one available from Sulzer Metco as Sulzer Metco 204NS7YSZ, and was fed to the torch using nitrogen carrier gas.

A part to be coated in this example was arranged on an ID surface of a 20 inch diameter cylindrical fixture, and rotated about a fixture axis while a spray torch traversed back and forth axially relative to the fixture while spraying perpendicularly to the surfaces to be coated.

The fuse or bond layer 108 was formed using relatively low energy plasma spray parameters, and the part surface was controlled to be relatively cool. In one example, the fixture rotated at 160 rpm. Air coolers were positioned to cool the OD of the part and maintain the substrates at a temperature below 300° F. The torch traversed at 24 inches per minute axially to the fixture, and was positioned to spray perpendicularly to the part ID surface at a spray distance of five inches. The torch was operated at 65 scfh of nitrogen and 6 scfh of nitrogen. A power supply amperage was adjusted to achieve a torch power level of 17 kW.

Powder was fed via a powder port at 50 grams/minute with 9 scfh of carrier gas flow rate. These conditions produced particles having an average temperature of about 2900° C. and a velocity of about 70 meters/second at the spray distance as measured with a Technar Accuraspray sensor. The torch traversed across the already bonded coated surface six times to produce a layer thickness of about 0.003. The strength of the layer as measured in tension perpendicular to its surface was about 1200 psi.

Maintaining this porosity of this thin coating is difficult using standard epoxy bonding methods, and these values were measured as part of the coating system after the hard and dense layers have been applied.

The hard or dense layer was formed using relatively high energy plasma spray parameters. The part surface temperature was allowed to reach elevated temperatures. In this example, the substrate temperature was limited to 500° F., however, so that silicon masking materials may be used.

The fixture rotated at 40 rpm. Air coolers were positioned to cool the outer diameter of the parts and maintain the substrate at a temperature below 500° C. Coolers were turned on after a preheat during which the torch passed over the part four times and the spray powder was turned on. Torch parameters were the same for the hard top coat as the bond layer. The torch traversed at six inches per minute axially to the fixture and was positioned to spray perpendicularly to the part inner diameter surface at a spray distance of 3.5 inches. The torch was operated at 120 scfh of nitrogen and 18 scfh of nitrogen. A power supply amperage was adjusted to achieve a torch power level of 46 kW. Powder was fed via a powder port at 50 g/minutes with 11 csfh of carrier gas flow rate. These conditions produced particles that had an average temperature of about 3500° C. and a velocity of about 130 m/s at the spray distance as measured with a Technar Accuraspray sensor. The torch traversed across the bond layer 40 times to produce a thickness of about 0.012 inches. The strength of this layer as measured in tension perpendicular to its surface was about 6000 psi.

The porosity of the bond layer and the hard layer are 4.4 and 5.4 g/cc in density, which equates to about 22 and 5 volume % porosity, respectively. Of course, these are merely examples.

Figure 3B:
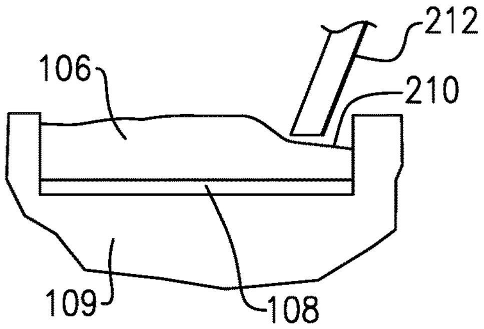
FIG. 3B shows a subsequent method step.

Then, as shown schematically in FIG. 3B, at 210 a tool 212 is depositing material to form the hard layer 106. This would be done with a higher velocity and/or higher plasma power level than the step of FIG. 3A, such that the layer 106 is formed by fine agglomerated and sintered or plasma densified powders. In addition, preheating of the substrate may be utilized. The effect of these changes in spray conditions is to provide higher inter-particle bond strength and a more dense coating.

A worker of ordinary skill in the metallurgical arts would recognize how to form the layers 108 and 106 of the same material in such that one is hard and the other has a low bond strength.

Particular ceramics which may be utilized include 98/2 (% weight) alumina/titania, and 7% (% weight) yttria stabilized zirconia. In addition, metals such as 88/12 Al/Si, Ni and Co alloys, may be utilized. Further, cermets and other ceramics may be utilized.

The two main characteristics is that there be a low bond strength in the layer 108. The "low" bond strength may be defined as having compressive strength and shear strength of greater than or equal to 200 psi and less than or equal to 2000 psi. More narrowly, the strengths may be between 750 and 1500 psi. Even more narrowly, the shear strength may be between 900 and 1250 psi. In addition, the hard layer 106 has erosion resistance capabilities.

In addition, the thickness of the hard layer 106 is maintained small enough that if breaking away does occur, such as shown in FIG. 2C, the gap between the outer tip 103 of the blade and the remaining portions of seal 104 is not so large that the engine will no longer operate. When discussing the thickness of the bond layer, any bond coating, as mentioned above, may be considered as part of the bond layer.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:

a rotating blade having a radially outer tip;

a housing positioned radially outwardly of said blade, a coating provided on said housing directly radially outwardly of said blade, said coating having at least two layers with a bond layer positioned between said housing and an erosion resistant layer, said erosion resistant layer having a hardness greater than a hardness of said bond layer, and said bond layer having a bond strength greater than or equal to 200 psi and less than or equal to 2000 psi, said bond strength is a cohesive bond strength;

said erosion resistant layer is a metal; and such that should the rotating blade radially outer tip contact said erosion resistant layer the bond layer will provide an effective fuse which releases the erosion resistant layer to prevent damage to the rotating blade.

2. The gas turbine engine as set forth in claim 1, wherein said bond strength is between 750 and 1500 psi.

3. The gas turbine engine as set forth in claim 2, wherein said bond strength is between 900 and 1250 psi.

4. The gas turbine engine as set forth in claim 1, wherein said erosion resistant layer has a thickness greater than or equal to 0.002 inch and less than or equal to 0.050 inch, and wherein a thickness of said bond layer is between 0.00075 inch and less than or equal to 0.00125 inch.

5. The gas turbine engine as set forth in claim 1, wherein said erosion resistant layer is an aluminum silicon alloy.

6. The gas turbine engine as set forth in claim 1, wherein said erosion resistant layer is a nickel alloy.

7. The gas turbine engine as set forth in claim 1, wherein said erosion resistant layer is a cobalt alloy.

8. The gas turbine engine as set forth in claim 1, wherein said rotating blade is in a compressor section of the gas turbine engine.

9. The gas turbine engine as set forth in claim 1, wherein said cohesive bond strength is a strength in a direction perpendicular to a rotational axis of the engine and thus a rotational axis of said rotating blade.

* * * * *